United States Patent [19]

Mittendorf et al.

[11] 3,831,696
[45] Aug. 27, 1974

[54] VEHICLE INSECT PROTECTION APPARATUS

[75] Inventors: Theodor H. Mittendorf, Mt. Dora; Dale L. Bennett, P.O. Box 1138, Mt. Dora, both of Fla. 32757

[73] Assignee: said Mittendorf, by said Bennett

[22] Filed: Jan. 22, 1973

[21] Appl. No.: 325,318

[52] U.S. Cl. .................... 180/68 P, 293/69, 296/91
[51] Int. Cl. ............................................. B60j 7/20
[58] Field of Search ............. 180/68 P; 296/91, 1 S; 293/69 R, 83

[56] References Cited
UNITED STATES PATENTS

| | | | |
|---|---|---|---|
| 2,034,493 | 3/1936 | Sonnenberg | 180/68 P X |
| 2,778,439 | 1/1957 | Pfingsten | 180/68 P |
| 2,792,254 | 5/1957 | Hagglund | 296/91 |
| 2,868,308 | 1/1959 | Biewald | 180/68 P |
| 2,872,242 | 2/1959 | Whartman et al. | 296/91 |

FOREIGN PATENTS OR APPLICATIONS 632,464   12/1961   Canada.................... 180/68 P Primary Examiner—Robert J. Spar
Assistant Examiner—Leslie J. Paperner
Attorney, Agent, or Firm—Duckworth, Hobby & Allen

[57] ABSTRACT

An insect protection apparatus for protecting moving vehicles from insects having a deflector shield for attachment to the front end of a vehicle for deflecting air currents and insects from the windshield of the vehicle and including a screen attached to the apparatus for covering an additional portion of the front end of a vehicle to catch insects to prevent the insects from hitting the front end of the car and getting into the vehicle radiator. The apparatus includes an easily attachable supporting system for the deflector shield and screen which is attached to the vehicle license plate holder and to the vehicle tire wells and having braces engaging the front end of the vehicle for ease in attaching and removing the apparatus from the vehicle.

6 Claims, 5 Drawing Figures

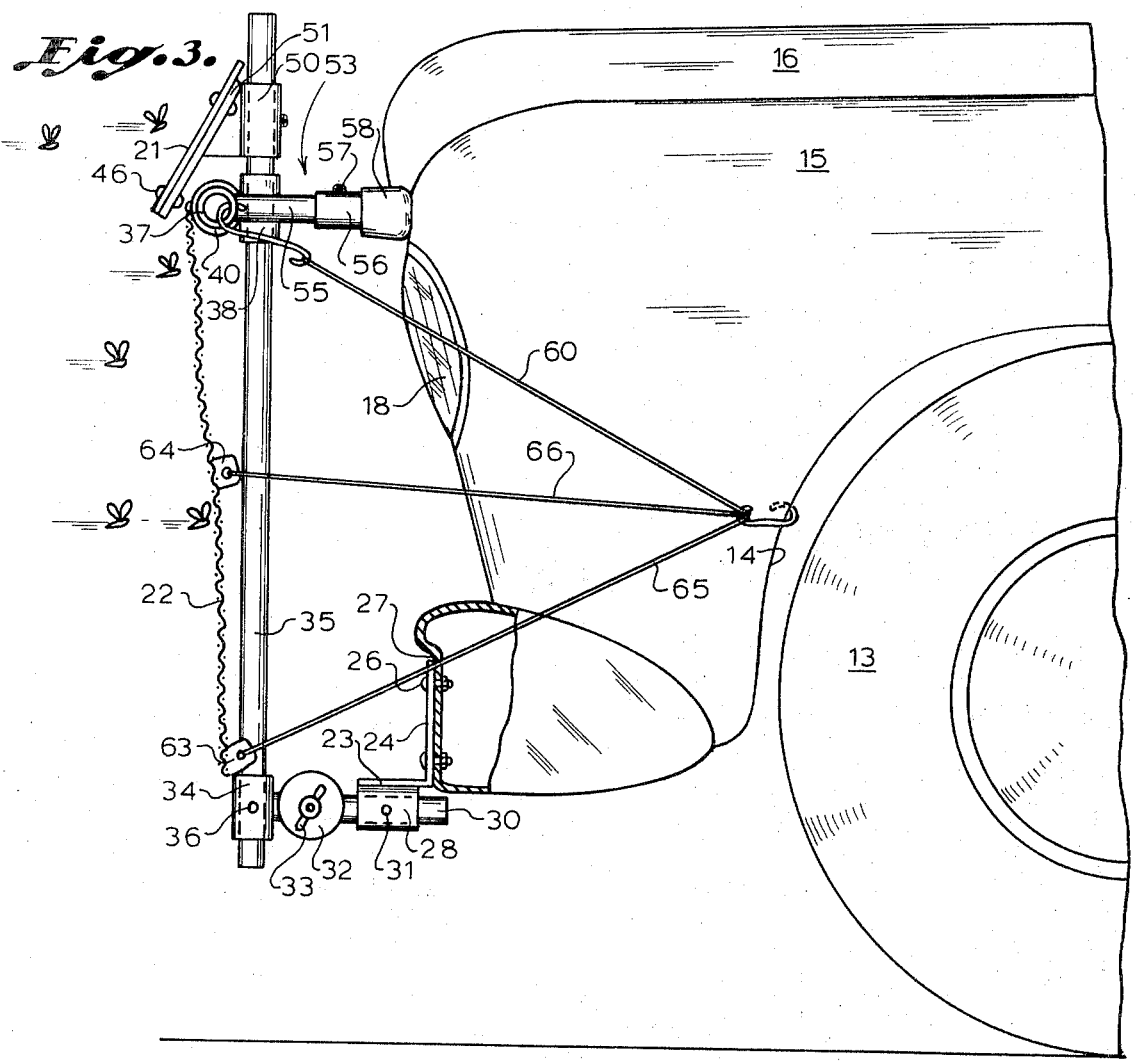
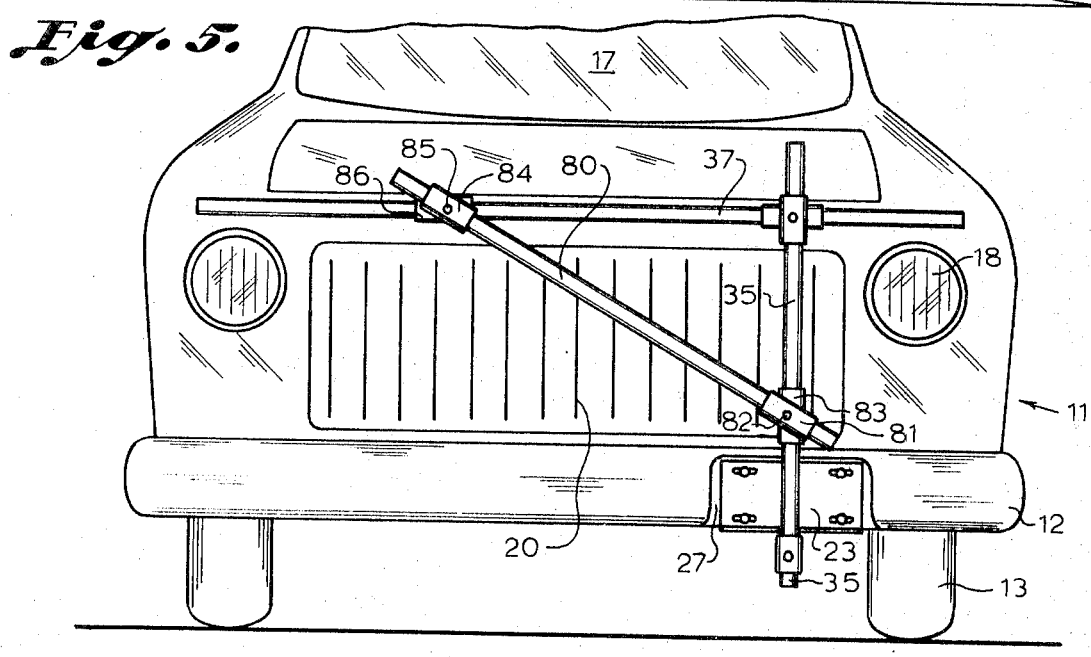

VEHICLE INSECT PROTECTION APPARATUS

BACKGROUND OF THE INVENTION

The present invention relates to a vehicle protection device for preventing insects and other materials from messing up the windshield and front end of a moving vehicle and from stopping up the radiator of the vehicle.

In the past it has been common to provide a great many deflectors for placement on different portions of a vehicle for controlling air currents and to prevent windshields from becoming messed up. One such deflector is placed on the top rear of a station wagon automobile to control air currents to prevent the rear window from becoming covered with dirt, and the like, from the eddy currents created by the vehicle. Other such devices provide deflectors placed on the hood or on the side vent windows for either controlling air currents or deflecting insects to prevent the insects from splattering against the windshield or from getting into the automobile.

One prior U.S. Pat. No. 3,269,455 teaches a bug screen employing a metallic frame having spring loaded latching means for attaching to the front of a vehicle. Such screens are used for catching insects while similar screens on the front of vehicles are also used to prevent other trash from getting into the radiator as well as providing some trash protection for passengers in the vehicle. In addition, the present invention provides for protection for the headlights which can lose some of their effectiveness by a large number of insects being splattered thereon and from hitting the windshield which reduces the visibility of the driver and passengers in the vehicle. This problem is especially acute in some southern states where twice a year Love Bugs enter their breeding season with very large numbers of slow moving matings bugs around the highways, and can completely cover the front end and the windshield of a vehicle. The bugs are very difficult to clear off of the windshield in front of the vehicle and to remove from the vehicle's radiator. One protection system that has been suggested wraps a piece of screen around the front end of the vehicle. This, however, does not protect the windshield of the vehicle.

The present invention is an improvement over my previous patent application, Ser. No. 306,171 filed Nov. 11, 1972, for a Vehicle Insect Protection Apparatus and advantageously provides an air current deflector system for directing insects in the path of a moving vehicle out of the path of the vehicle windshield along with additional protection to prevent such insects from messing up the front of the vehicle and clogging up the radiator. The present system is easily attached and removed from the vehicle and one system will attach to most vehicles.

SUMMARY OF THE INVENTION

An insect protection apparatus for moving vehicles is provided having a deflector shield or deflector surfaces for directing air currents and insects away from a vehicle windshield. The deflector shield has a shield supporting system including horizontal bar extending across the front of a vehicle having brackets extending upwards for attaching the shield at a predetermined angle. A shield supporting bar is held by vertically extending supporting member which is attached to a license plate bracket which is bolted directly to the plate of a front license plate of an automobile and is further supported by a pair of braces attached to the horizontal shield supporting bar and extending backwards to brace against the front end of the vehicle. A flexible and resilient cord is attached to both ends of the deflector shield supporting bar which cords have hooks on the opposite end for hooking onto the tire wells for holding the brace members against the front of the vehicle. Finally, a screen is attached to the shield supporting bar for extending over the remainder of the front end of the vehicle and may be attached by additional flexible cords to the bumper or tire well. Additional features provide a shield member which slides over the vertically extending support member as well as adjustable features for adjusting the attachable system for different vehicles.

BRIEF DESCRIPTION OF THE DRAWINGS

Other objects, features and advantages of this invention will be apparent from a study of the written description and the drawings in which:

FIG. 3 is a side sectional view of the embodiment in accordance with FIGS. 1 and 2 attached to the front end of a vehicle;

FIG. 5 is a front sectional view of an alternate embodiment for attachment to vehicles having license plate holders set to one side of the vehicle.

DESCRIPTION OF THE PREFERRED EMBODIMENTS

Figure 1:
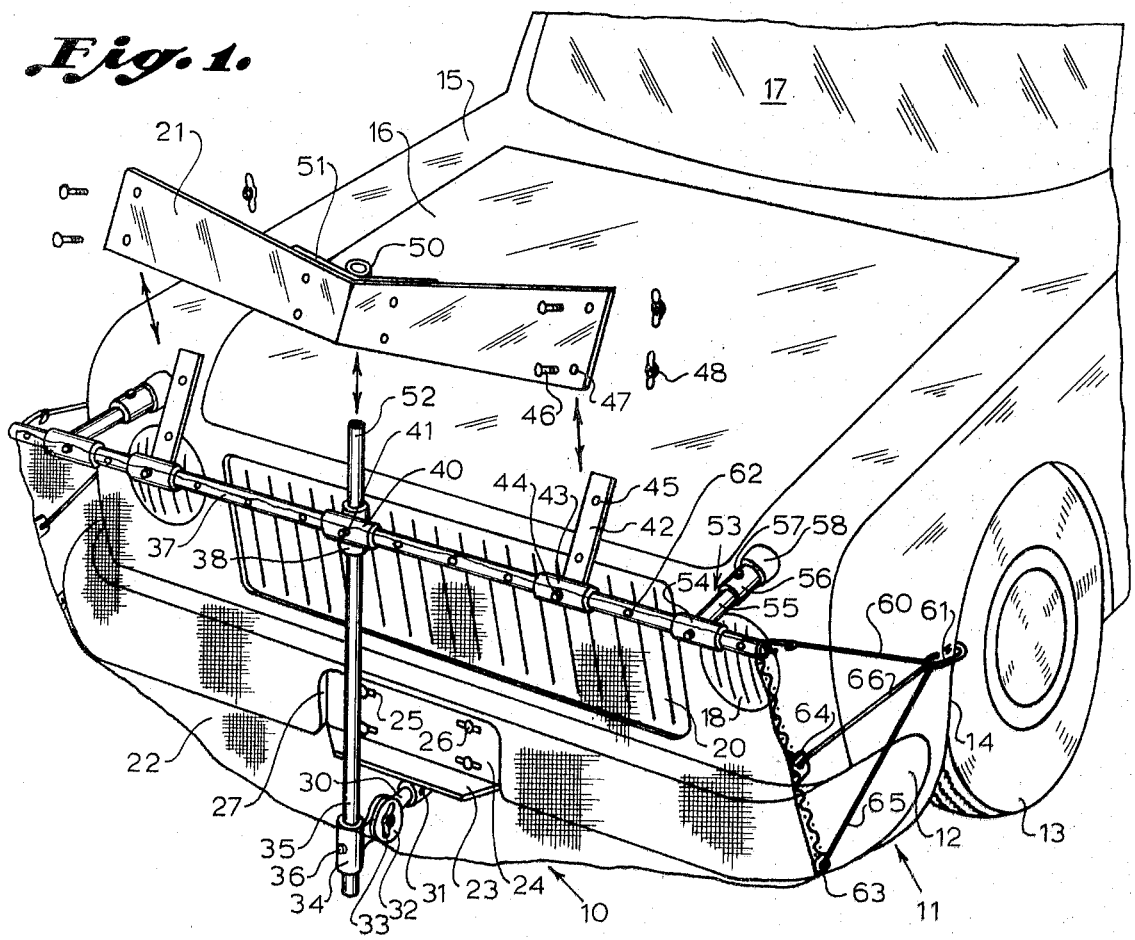
FIG. 1 is a perspective view of an automobile having the bug protective apparatus of the present invention attached thereto, with the deflector shield shown in an exploded perspective.
Figure 2:
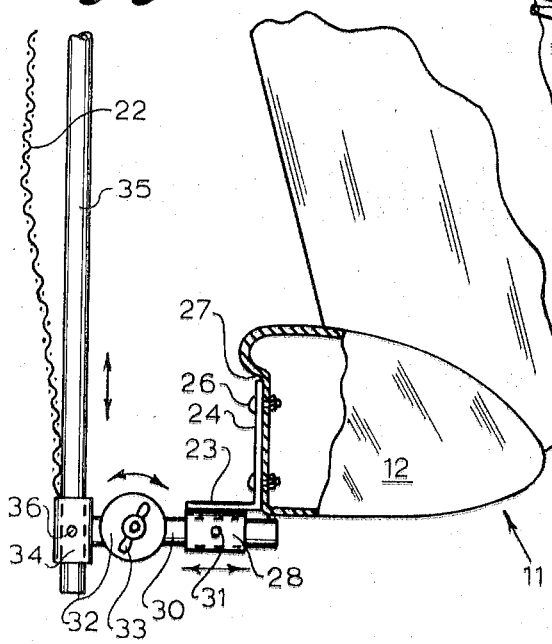
FIG. 2 is a side sectional view of the license plate attachment bracket of the apparatus in accordance with FIG. 1.

Referring now to FIGS. 1, 2 and 3, a preferred embodiment of the present invention 10 is illustrated to an automobile 11 having a front bumper 12, a front tire 13 partially enclosed by tire well 14 formed in the fenders 15 and having a hood 16. A vehicle has a front windshield 17, lights 18 and a front grill work 20. The vehicle when driven at higher speeds, especially in the late afternoon and evenings, tends to become splattered with insects. This is especially annoying in some southern states where large love bug populations tend to block the entire front of a vehicle stopping up the radiator, causing the car to overheat, while blocking the headlights, reducing their effectiveness and completely covering the windshield of the vehicle making it difficult to drive. Splattered bugs are very difficult to clean up and will damage the paint and chrome on the vehicle. Thus, various protective systems have been suggested. With the present system 10 having a deflector shield 21 located on the front of the vehicle to direct bugs and wind currents away from the windshield 17, and having a screen 22 attached to the deflector 21 or to support members for extending over the rest of the front end of the vehicle to prevent the bugs from getting through the screen and stopping up the vehicle's radiator, damaging the paint on the front of the vehicle. The apparatus 10 is easily attached to the vehicle 11 by special bracket 23 which is angle iron shaped having a back support member 24 of the approximate size of a vehicle license plate having slotted openings 25 located similar to a license plate for attaching with bolts 26 on the license plate holder 27 which may be part of the bumper 12 or may be otherwise located on the front of the vehicle 11. The license plate holder is normally located in the center front of the vehicle, but in some vehicles is located to one side. At any rate, the bracket 23 is easily and quickly attached to the vehicle, has a female telescoping portion 28 attached to the bottom thereof, with a male telescoping portion 30 which can be positioned and locked with a setscrew 31. The telescoping portion 30 is attached by a rotatable connection 32 having a butterfly wing nut 33 for rotating a vertical support holding sleeve 34. The holding sleeve 34 may be adjusted through a variety of angles by tightening and loosening the wing nut 33 and is adapted for the vertical support member 35 to slide in the sleeve 34 and to be anchored with a set screw 36. The vertical support member 35 is adjustably attached to a horizontal deflector shield 21 supporting member 37 by sleeve 38 which is in turn fixedly attached to a horizontal sleeve 40 which holds the horizontal bar deflector support 37 with a setscrew 41. The horizontal support bar 37 has a pair of shield supporting brackets 42 having sleeves 43 held in place by set screws 44. Brackets 42 have openings 45 therein for attaching the deflector shield 21 thereto with bolts 46 passing through openings 47 in the shield 21 and the openings 45 for attachment with wing nuts 48. Shield 21 is attached at the angle to which the brackets 42 are extending from the bar 37. Shield 21 also has a sleeve 50 attached to the center thereof with reinforcing metal brackets 51 so that the sleeve 50 may slide over the top portion 52 of the vertical support member 35. The horizontal extending bar 37 is further supported by a pair of telescoping brace members 53 having sleeves 54 for sliding over the bar 37 along with a male telescoping member 55 and a female telescoping member 56 and an anchoring set screw 57. The telescoping members 53 have rubber feet 58 for engaging the front end of the vehicle 11 in a manner to prevent damage to the vehicle paint. Braces 53 are held tightly against the front of the vehicle by a flexible and resilient cord 60 attached at both ends of the horizontal deflector support 37 and having hooks 61 for quickly attaching the resilient cord 60 to the tire well 14 for further holding the braces 53 against the front of the vehicle. Screen 22 is attached to the horizontal supporting member 37 with rivets 62 but could of course be attached in other manners such as screws, clips, or adhesives, without departing from the spirit and scope of the invention. The screen extends parallel with the front of the vehicle and has reinforcing tabs 63 and 64 located on both sides of the screen and having resilient cords 65 and 66 attached thereto at one end and attached to the hook 61 at the other end for pulling the screen taut over the front end of the vehicle. In operation, the present invention may be quickly attached to the vehicle by bolting the bracket 23 to the license plate holder 27 on the front end of the vehicle, the braces 53 adjusted to engage the front of the vehicle and hooks 61 snapped onto the tire wells. Adjustments may be made to adjust the apparatus for the particular vehicle and the deflector shield 21 deflects the oncoming bugs as illustrated in FIG. 3 while the screen 22 catches bugs which would normally splatter on the front of the vehicle or get caught in the radiator of the vehicle. The ease of attachment and removal is especially convenient in view of the love bug season lasting only a few weeks, during which time the apparatus may be attached to the vehicle and following which time it may be removed.

Figure 4:
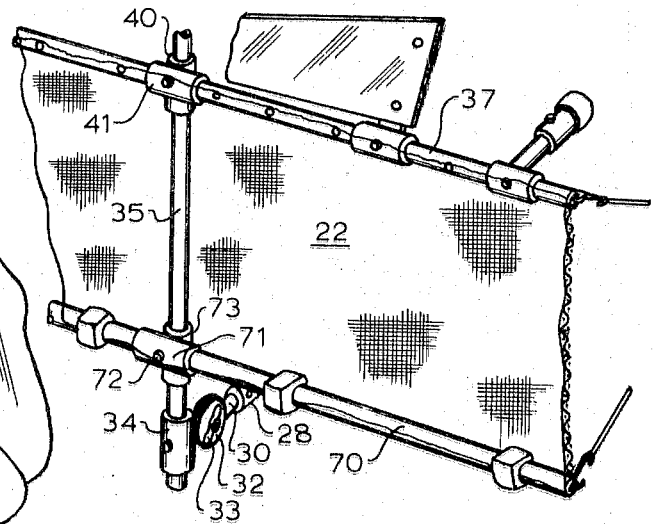
FIG. 4 illustrates a cutaway perspective view of a second embodiment of the invention having second horizontal supporting bars.

FIG. 4 illustrates an alternate embodiment having the vertical supporting bar 35 and horizontal supporting bar 37 and sleeves 40, 41 for attaching bars 35 and 37 together. The sleeve 34 for holding the bottom portion of the vertical bar 35 includes the attachment 32 connected to the telescoping members 28 and 30. This embodiment includes the screen 22, but additionally has a second horizontal bar 70 attached to a horizontal sleeve 71 which holds the bar 70 by set screw 72. Sleeve 71 has a vertical extending bar 35. This bottom horizontal extending bar 70 provides additional support for the screen 22 and holds the bottom of the screen in place doing away with the tabs 63, 64 and resilient cord 66 of the embodiments in FIGS. 1 – 3. Cord 65 is attached to the end of bar 70.

FIG. 5 illustrates yet another embodiment which includes the embodiment of FIGS. 1 – 3 having a license plate holder 27 attaching bracket 23 along with the vertical support 35 horizontal support member 37, and the various attaching sleeves for attaching to the front end of the vehicle 11 having bumper 12, tires 13, front lights 18, windshield 17 and grill 20. This embodiment includes all of the features including the deflector shield and screen which are not shown in this view since the only variation is the addition of the diagonal support member 80 attached through a diagonal sleeve 81 held in place by set screw 82. The diagonal sleeve 81 has a vertically extending sleeve 83 which attaches to the vertically extending member 35. The diagonal extending bar 80 attaches to a second diagonal extending sleeve 84 and is held by set screw 85 and is further attached to a horizontal sleeve 86 which in turn is attached to horizontal bar 37. In this embodiment the license plate holder 27 is to one side of the front of the vehicle and for this reason requires the additional support bar 80 to support the extended portion of the bar 37 for the additional support required.

It should be clear at this point that an insect protection apparatus for moving automobiles has been provided but it should also be clear that the system provides protection against more than insects and would prevent scraps of paper and other trash from getting caught in the radiator on the vehicle and reducing its cooling capacity. This system may be made of any materials desired, but the preferred screen is standard household window screen of a plastic, fiberglass or metal material while the shield 21 may be made of a molded polymer material or can be easily made of various types of wood or metal. The entire support system can be made of aluminum or steel pipe using standard set screws or rivets but having a rubber or plastic tip 58 for the front end braces. The flexible cords 60, 65 and 66 can be any flexible cord material but would preferably be an elastic material and the connecting hook 61 are rubber or plastic coated to prevent scratching the paint of the vehicle. It should also be noted that the deflector shield 21 is shaped to provide a flat surface which is smaller in the center and expands towards the edges which eliminates the necessity of the shield having dual angles for directing air currents both upward and outward from the car.

This invention is not to be construed as limited to the particular forms disclosed herein since these are to be regarded as illustrative rather than restrictive.

I claim:

1. An insect protection apparatus for moving vehicles comprising in combination:
    a. a deflector shield having deflector surfaces for directing air currents and insetcs away from a vehicle windshield, said deflector shield including a shield supporting means for holding said shield in a predetermined position;
    b. a screen attached to said deflector shield for extending over the front end of a vehicle;
    c. a license plate bracket means shaped for removable attachment to a vehicle front and license plate holder;
    d. support means attached to said bracket means and to said deflector shield support means for rigidly holding said deflector shield means, said license plate bracket means having a sleeve for attachment to said support means and being rotatably and telescopically held for adjusting the position of said support member relative to said license plate bracket means;
    e. a plurality of brace members attached to said deflector shield support means for engaging the front end of a vehicle to provide additional support for said apparatus, said bracing member extending generally perpendicular from said deflector shield support and being adjustable to fit different vehicles;
    f. attachment means attached to said deflector shield support means for removable attachment to the front end of a vehicle for holding said brace members to the front end of a vehicle whereby said insect protective apparatus is fixedly attachable to a vehicle; and
    g. an adjustable attaching means for adjustably connecting said support means to said deflector shield support means for adjusting the position of the support means and the deflector shield support means relative to each other whereby an insect protection apparatus is provided which is adjustable for a variety of vehicle front ends.

2. The apparatus in accordance with claim 1 in which said support means includes a horizontally held bar having angled support brackets attached thereto for attachment of said deflector shield at a predetermined angle.

3. The apparatus in accordance with claim 1 in which said attachment means includes an elastic cord attached to each end of said deflector shield supporting means and having tire well hooks thereon for engaging the tire wells of a vehicle when said apparatus is attached to a vehicle.

4. The apparatus in accordance with claim 3 in which said braces telescope for adjustment of a distance between ends of the braces and the deflector shield supporting means.

5. The apparatus in accordance with claim 1 including a diagonal supporting member connected to said support means and to said shield supporting means to provide additional support for said shield supporting means when said license plate bracket is attached to one side of the front of a vehicle.

6. The apparatus in accordance with claim 1 in which said shield supporting means includes one horizontal bar for attaching said screen to and a second horizontal bar is attached to said support means for attaching another portion of said screen to for maintaining the position of said screen when attached to a vehicle.

* * * * *